United States Patent [19]
Conklin

[11] 3,891,786
[45] June 24, 1975

[54] ELECTRICALLY CONDUCTIVE SHEETING

[75] Inventor: Christine Conklin, Newark, N.J.

[73] Assignee: Herculite Protective Fabrics Corporation, New York, N.Y.

[22] Filed: Oct. 5, 1973

[21] Appl. No.: 403,730

[52] U.S. Cl. ............ 428/136; 428/244; 428/367; 428/409; 428/520; 428/521; 428/907; 428/921
[51] Int. Cl.² .............. H05F 3/00; B32B 25/02; B32B 25/08; B32B 3/24
[58] Field of Search ........... 161/112, 113, 158–162, 161/87, 89, 95, 96, 253, 254, 403

[56] References Cited
UNITED STATES PATENTS

| | | | |
|---|---|---|---|
| 2,054,274 | 9/1936 | Sullivan | 161/112 X |
| 2,455,454 | 12/1948 | Walter | 161/403 |
| 2,498,493 | 2/1950 | Hickernell | 156/275 X |
| 2,646,797 | 7/1953 | Scholl | 161/159 X |
| 2,872,366 | 2/1959 | Kiernan et al. | 161/254 X |
| 3,007,083 | 10/1961 | MacQuaid et al. | 117/226 X |
| 3,076,727 | 2/1963 | Harwig | 117/71 R |
| 3,151,548 | 10/1964 | Picking | 117/35.5 X |
| 3,278,455 | 10/1966 | Feather | 117/217 X |
| 3,314,425 | 4/1967 | Coppick | 161/89 X |
| 3,379,658 | 4/1968 | Kemper | 161/89 X |
| 3,406,316 | 10/1968 | Ito | 317/2 B |
| 3,475,213 | 10/1969 | Stow | 117/226 X |
| 3,542,633 | 11/1970 | Goldsmith | 161/189 X |
| 3,586,597 | 6/1971 | Okuhashi | 161/87 |
| 3,607,593 | 9/1971 | Semenzato | 161/87 |
| 3,783,085 | 1/1974 | Pearson et al. | 161/87 |
| 3,844,875 | 10/1974 | Chamberlain | 161/112 |

Primary Examiner—Harold Ansher
Attorney, Agent, or Firm—Sughrue, Rothwell, Mion, Zinn and Macpeak

[57] ABSTRACT

Electrically conductive sheeting (resistivity well below $10^6$ ohms) and methods for producing such sheeting are disclosed. Preferred sheeting is a fabric having outer plies of flexible polymeric film, such as, polyvinylchloride, and a core layer of rubber, such as, synthetic acrylonitrilebutadiene rubber which may be blended with polyvinylchloride resins, the rubber containing at least from about 25 to about 40 percent by weight of electrical grade carbon black. The outer polymeric layers are perforated in a density of from about 5 to about 25 perforations per square inch or greater, the perforations preferably having a size on the order of from 0.003 to 0.012 inch (3 to 12 mils). The perforations may be formed prior to or after coating or bonding of the polymeric films with the rubber core layer, and the final product may be pressed to seal the perforations providing a non-porous conductive sheeting material. In one preferred embodiment one exterior surface of the sheeting is provided with a coating or layer which dissipates or reflects radiant energy.

32 Claims, 3 Drawing Figures

PATENTED JUN 24 1975 3,891,786

ELECTRICALLY CONDUCTIVE SHEETING

BACKGROUND OF THE INVENTION

1. Field of the Invention

This invention relates to electrically conductive sheeting which is highly resistant to wear and deterioration of the electrical properties and which is especially suited to use in environments where accumulation of static electricity on the surface of the sheeting material would be hazardous.

2. Description of the Prior Art

Electrically conductive sheeting materials presently available on a commercial basis include fabric or polymer film substrates coated with electrically conductive compositions applied by knife, bar, dip coating or impregnation processes. The commercially available materials having Underwriters Laboratory listing are rubber, filled with electrical grade carbon, coated to a cotton backing. Such materials present a black, heat absorptive surface.

Various laminated fabrics having calendered electrically conductive films laminated to the exterior surfaces of the base fabric are available. Self-supporting electrically conductive films are also available and may be produced by calendering or be casting or transfer coating methods. Electrically conductive laminates comprising a ply of electrically conducting metal foil are also known, but are too expensive and/or structurally unsuited for many applications.

Conventional products, such as those described above, suffer from certain drawbacks which greatly limit their usefulness. Because of the relatively large quantity of electrically conductive filler, such as metal powder or carbon black, in some of the products, the outer surfaces are generally brittle and friable. These materials crack, crock, abrade and are pulverized relatively easily. This attrition may render the sheeting materials useless in a fairly short period of time due to deterioration of the electrical and mechanical properties of the sheeting.

It is often also desirable to combine other properties in the electrically conductive sheeting material, such as flame retardance, antibacterial activity, and the like. However, because of the heavy loading of the outer surfaces of most conventional sheeting with conductive fillers, such as carbon black, it is difficult to achieve the effective levels of these other properties.

Finally, the prior art conductive sheeting materials which are available and which are produced by casting are quite expensive, while the films produced by calendering offer substantial production difficulties, because of the high loading of filler required to attain the desired level of electrical conductivity.

BRIEF DESCRIPTION OF THE INVENTION

Briefly, the present invention comprises electrically conductive sheeting material consisting of a solid, non-porous polymeric substrate layer having applied to one surface a layer of rubber filled with from about 25 to about 40 percent by weight of electrical grade carbon black. The polymer layer is micro-perforated in a density of from about 5 to 25 perforations per square inch, by perforating with needles having a diameter of from about 0.003 to 0.012 (3 to 12 mils). Perforation of the polymer layer may be accomplished before or after the rubber layer is applied. The sheeting may be left with the perforations unclosed or the material may be pressed to seal off or close the perforations. The uncoated surface of the polymer film exhibits excellent electrical conductivity. Sheeting is generally considered to be electrically conductive if the surface and volume resistivity is below about $10^6$ ohms and, the products of this invention generally exhibit levels of electrical conductivity lower than $10^4$ ohms. The carbon black filled rubber layer is preferably the core layer of a laminate in which both of the outer films are perforated polymer films whose perforations may be open or sealed.

DETAILED DESCRIPTION OF THE INVENTION

Figure 1:
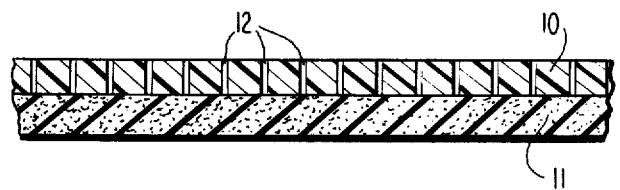
FIG. 1 is a cross-sectional, schematic view of an electrically conductive sheeting material produced in accordance with the present invention.

The present invention relates to the production of electrically conductive sheeting materials which are fabrics containing at least one flexible solid, non-porous, polymeric film of low conductivity, a surface of which would ordinarily be characterized by an electrical resistance on the order of $10^{11}$ ohms or greater. It has been found in accordance with this invention that the exposed surface of such films can be rendered electrically conductive so as to meet the standards of The National Fire Protection Assoc. test procedures reported in NFPA 56A Bulletin at page 40, Section 254, "Accessories," paragraph 2,541, "Conductive Covers and Sheeting." The test requirement under specified conditions calls for the resistance between two electrodes on the same surface or in the middle of opposite surfaces of the sheeting not to exceed $10^6$ ohms.

In accordance with the present invention electrically conductive sheeting, as measured by the foregoing standard, is produced by coating or laminating a low conductivity polymer film with a layer of rubber loaded or filled with from about 25 to about 40 percent by weight of the rubber layer of electrical grade carbon black. The polymer film or layer is provided with micro-perforations in a density from about 5 to about 25 perforations per square inch of polymer surface. These micro-perforations may be produced in any suitable fashion, as by puncturing with needles in a size range of from about 0.003 to 0.012 (3 to 12 mils). The precise size of the perforations is not absolutely critical but the diameter should be such that the perforations are just barely visible to the naked eye when a sheet of the polymer is held up to a light.

The preferred material for the exterior polymer layer is polyvinyl-chloride having a thickness of up to about 20 mils. Other polymer films useful in the invention include, polyurethane, polyolefins, polyesters, chlorosulfonated polyethylene, e.g., hypalon, polychloroprene (neoprene) and other suitable polymeric substrates.

Any natural or synthetic rubber composition capable of accepting about 40 percent or more of electrical grade carbon black filler and capable of being adherently applied as a layer to the selected polymer substrate can be utilized in this invention, but applicant has found that acrylonitrile-butadiene rubber compositions are particularly satisfactory. Other suitable rubber compositions include polyurethane, polychloroprene and other latex or solvent coatings which are capable of accepting the electrically conductive carbon black loading required and will adhere and be compatible with the polymer substrate.

The electrically conductive filler is preferably carbon black, but may also be powdered metal and mixtures of carbon black and powdered metal.

In a preferred embodiment two outer plies of polymeric film are brought together so as to sandwich an internal or core layer of the carbon black filled rubber composition. One or both of the exterior polymer films is needled or micro-perforated as described above so that one or both surfaces of the sheeting will achieve the desired level of electrical conductivity. By perforating both films, volume resistivity of less than $10^6$ ohms and low resistivity on both exterior surfaces can be obtained. Additional intermediate layers or plies of reinforcing fabric may be introduced into the laminate, and, in order to produce a particularly high strength laminated assembly, an inner element of scrim of nylon yarn is particularly desirable. However, any type of yarn can be utilized to improve the strength.

Figure 2:
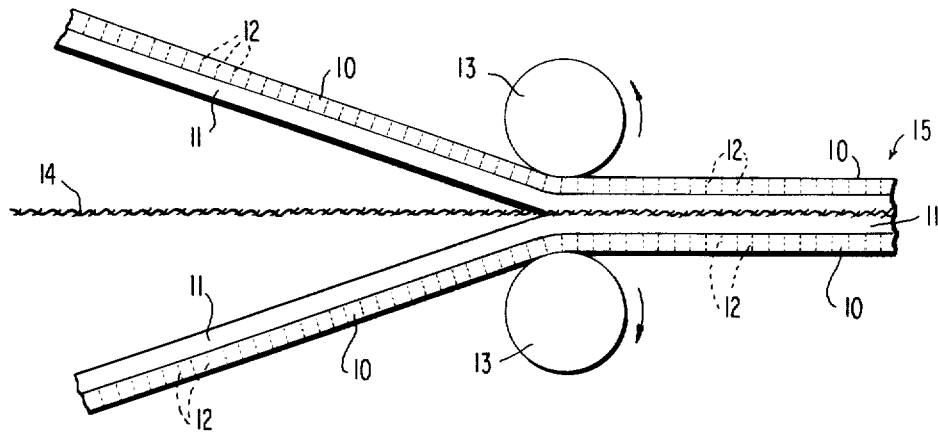
FIG. 2 illustrates schematically and in cross-section both one method for producing a sheeting in accordance with the invention and the resulting sheeting itself.

Referring to the drawing, FIG. 1 is a cross-sectional schematic view of a basic sheeting produced in accordance with the present invention in which a solid, non-porous layer of polymeric material 10 is coated and thereby bonded with a rubber layer 11 which is filled with at least from about 25 to about 40 percent by weight of the rubber film of electrical grade carbon black. Before or after the coating, layer 10 is provided with micro-perforations 12 of a density of about 16 per square inch of surface area of the polymer film. FIG. 2 illustrates schematically in cross-section a preferred embodiment wherein two plies of coated stock of the type illustrated in FIG. 1 are brought together between laminating rolls 13 to sandwich an intermediate layer of nylon scrim 14 to produce a five element laminated assembly 15. As described in connection with FIG. 1 the micro-perforation of the polymer layers may be accomplished before or after application of the electrically conductive layer. If, however, it is desired to obtain conductivity on only one of the exterior surfaces of the fabric, then one of the component coated films should first be perforated and then brought together in the final assembly with a coated stock element including an unperforated exterior polymer film layer.

Figure 3:
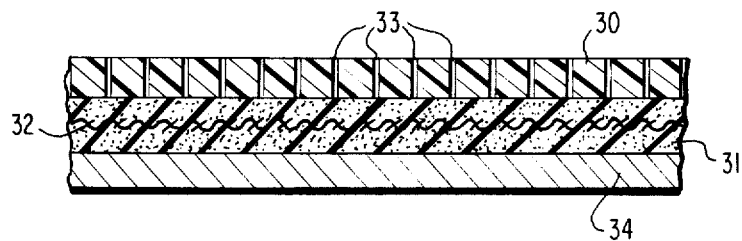
FIG. 3 is a cross-sectional, schematic view of an electrically conductive sheeting material produced in accordance with the invention which is especially useful as a covering for pallets of ammunition or other explosive or heat sensitive material.

The invention lends itself especially to the production of sheeting for protecting or covering heat sensitive materials, such as, ammunition. Referring to FIG. 3, an electrically conductive sheeting is provided which comprises a ply of polymeric material, e.g., polyvinyl chloride film 30, laminated to a core of rubber 31 filled with electrical grade carbon black. The ply of polyvinyl chloride is provided with micro-perforations 33 as described above. A reinforcing nylon scrim 32 is bonded in the core layer. The other outer ply of the laminate is a radiation reflective material, such as, a white or bright aluminum film 34 which provides a surface reflective to solar energy and other heat sources.

The invention will be more fully understood by reference to the following specific examples.

EXAMPLE 1

An electrically conductive flame retardant, antibacterial fabric was made by coating a surface of flame retardant flexible polyvinyl chloride film having a thickness of 4 mils by the application of a coating of the following composition:

7.5 grams of electrical grade carbon black,
1.6 grams of antimony oxide,
captan N-[(trichloromethyl)thio]-4-cyclohexene-1,2-dicarboximide,
19 parts of acrylonitrile-butadiene rubber blended with polyvinyl chloride resins and containing 81 parts of a solvent blend of 50/50 methylethyl ketone/toluene The antimony oxide is added to improve flame resistance, and the captan is added to impart antibacterial properties.

After drying to remove the solvent, the exterior surface of the polyvinyl chloride film has a surface resistance of 5.5 times $10^9$ ohms, the exterior surface of the rubber layer has a resistance of $2.3 \times 10^2$ ohms and the volume resistivity is $1.1 \times 10^8$ ohms. Before coating the volume and surface resistivity of the polyvinyl chloride film was greater than $10^{11}$ ohms. The coated substrates were then perforated with small needle holes with a sewing machine needle approximately 0.008 in diameter in a density of approximately 16 perforations per square inch. The surface resistivity on the exterior polymer film was then measured at $1.3 \times 10^3$ ohms and the surface resistivity of the exterior surface of the rubber layer was $2.3 \times 10^2$ ohms. The volume resistivity of the coated film was reduced to $4.2 \times 10^2$ ohms. At this point the coated sheeting is suitable for use as a porous conductive sheeting material.

EXAMPLE 2

The material of Example 1 was then subjected to a temperature of 250°F and a pressure of 50 psi to seal off the perforations, thus producing a non-porous electrically conductive sheeting material.

EXAMPLE 3

Two plies of coated stock prepared in accordance with the process of Example 2 were then brought together with their rubber layers facing towards one another and with a nylon scrim material sandwiched in between the two coated components. Lamination was effected under a pressure of approximately 50 psi at a temperature of 300°F by passing the materials through heated rolls. The nylon scrim is an open, porous mesh of nylon yarn of a type well known in the art.

The resulting laminate was then tested and was shown to have an electrical resistance of $1.8 \times 10^3$ ohms on one exterior surface and $1.5 \times 10^3$ ohms on the second exterior polymer surface and a volume resistivity of $1.3 \times 10^3$ ohms.

The electrically conductive sheeting prepared in accordance with Example 3 was submitted to Underwriter's Laboratory for testing of conductivity in accordance with NFPA 56A, paragraphs 2,523(b) and (c). The Underwriter's tests measure the conductivity of the fabric also after exposure to various environmental an in-use conditions including (1) oven aging at 70°C (158°F) for 60 days, (2) immersion for 5 days in No. 30 motor oil, (3) immersion for 15 minutes in liquid ethyl ether, (4) exposure for 24 hours to 24 common antiseptics, such as, mercurochrome, iodine, phenol, cresol, LYSOL, etc., (5) flexing tests involving flexing the fabric, with a two pound weight attached, over a bar for a total of 300 cycles, (the 300 cycles are subdivided into test units of 50 cycles each run at various ranges of humidity and temperature), (6) laundering for 24 cycles using a 2 percent solution of coconut oil base soap, and (7) sterilization.

The electrically conductive sheeting of the present invention retained its electrical conductivity after all of the foregoing testing procedures. The laminated sheeting retains the specific properties of the initial polymer films and any reinforcement fabric that may be used and hence allows for building a wide variety of aesthetic, mechanical and chemical properties into the end product, in addition to the desired electrical conductivity. For example colored polyvinyl chloride films may be employed, and the films may be embossed, printed or otherwise decorated.

Likewise the method used to make the multiple, electrically conductive sheeting of this invention may be varied to include pressure lamination, solvent bonding, coating and combinations of the foregoing and other techniques as dictated by the materials to be used and the end product to be produced.

It will be apparent to those skilled in the art that modifications may be made in the products and processes described herein without departing from the spirit and scope of the invention as expressed in the following claims.

What is claimed is:

1. A flexible, electrically conductive sheeting having a surface resistivity and a volume resistivity, each below $10^6$ ohms comprising:
   a first solid layer of a polymeric film material which, prior to incorporation in said sheeting has a surface resistivity of at least above $10^6$ ohms,
   a second layer of rubber bonded to one surface of said polymeric film material, said rubber being filled with from about 25 to about 40 by weight of the rubber of electrical grade carbon black, and
   said first layer of polymeric film material having micro-perforations in a density of from about 5 to about 25 micro-perforations per square inch, the micro-perforations having a diameter of from about 0.003 to about 0.012 inch.

2. The article of claim 1 wherein said first layer is a film of polyvinylchloride.

3. The article of claim 1 wherein the rubber is an acrylonitrile-butadiene rubber composition.

4. The article of claim 1 wherein said rubber is a blend of acrylonitrile-butadiene rubber and polyvinylchloride resin.

5. The article of claim 1 wherein said microperforations are sealed after formation.

6. The article of claim 1 wherein said sheeting further comprises an amount of a flame retardant agent sufficient to improve the flame retardance of said sheeting.

7. The article of claim 4 wherein said flame retardant agent is antimony oxide.

8. The article of claim 1 wherein said sheeting further comprises an amount of an antibacterial agent sufficient to improve the antibacterial activity of the surface of said sheeting.

9. The article of claim 8 wherein said antibacterial agent is N-[(trichloromethyl)thio]-4-cyclohexene-1,2-dicarboximide.

10. The article of claim 1 further comprising a third layer which sandwiches said second rubber layer between said third and first layers.

11. The article of claim 10 wherein said third layer is perforated in the same manner as said first layer.

12. The article of claim 11 wherein said microperforations are sealed after formation.

13. The article of claim 11 further comprising a reinforcing element between said first and third layers.

14. The article of claim 13 wherein said reinforcing element is a nylon scrim.

15. The article of claim 10 further comprising a reinforcing element between said first and third layers.

16. The article of claim 15 wherein said reinforcing element is a nylon scrim.

17. The article of claim 10 wherein said first and third layers are solid polyvinylchloride films and said layer of rubber is a blend of acrylonitrile-butadiene rubber and polyvinylchloride resin.

18. The article of claim 17 wherein said microperforations are sealed after formation.

19. The article of claim 17 wherein said first and third layers have microperforations in a density of from about 5 to about 25 per square inch, said microperforations having a diameter of from about 0.003 to about 0.012 inch and being sealed over to produce a nonporous sheeting.

20. The article of claim 17 further comprising a reinforcing element between said first and third layers.

21. The article of claim 20 wherein said microperforations are sealed after formation.

22. The article of claim 20 wherein said reinforcing element is a scrim of nylon yarn.

23. The article of claim 22 wherein said microperforations are sealed after formation.

24. A method for producing electrically conductive sheeting material having a surface resistivity below $10^6$ ohms comprising providing a first layer of solid, non-porous, polymeric film material normally having a surface resistivity at least above $10^6$ ohms
   bonding to said first layer one surface of a second layer of rubber filled with at least about 40 percent by weight of the rubber of electrical grade carbon black, and
   either before or after bonding to said second layer, perforating said first layer with microperforations having a density of from about 5 to about 25 microperforations per square inch of surface area of said polymer layer, said microperforations having a diameter of from about 0.003 to about 0.012 inch.

25. The method of claim 24 wherein said rubber layer is a composition of acrylonitrile-butadiene rubber.

26. The method of claim 24 further comprising sealing off said perforations after formation to provide a non-porous laminate.

27. The method of claim 24 further comprising bonding a third layer to the other surface of said second layer.

28. The method of claim 27 wherein said first layer is a film of polyvinylchloride.

29. The method of claim 27 wherein said third layer is a film of polyvinylchloride.

30. The method of claim 27 wherein said third layer is provided with microperforations of the same density and diameter as said first layer, and said microperforations are sealed off after formation.

31. The method of claim 27 further comprising bonding a reinforcing element between said first and said third layers.

32. The method of claim 31 wherein said reinforcing element is a nylon scrim.

* * * * *